(12) United States Patent
Wang et al.

(10) Patent No.: US 12,224,668 B2
(45) Date of Patent: Feb. 11, 2025

(54) BOOST CONVERTER AND METHOD OF CONTROLLING A BOOST CONVERTER

(71) Applicant: SIGNIFY HOLDING B.V., Eindhoven (NL)

(72) Inventors: Yu Wang, Shanghai (CN); Zhiquan Chen, Shanghai (CN); Jie Fu, Shanghai (CN); Shan Wang, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 122 days.

(21) Appl. No.: 18/014,331

(22) PCT Filed: Jun. 23, 2021

(86) PCT No.: PCT/EP2021/067087
§ 371 (c)(1),
(2) Date: Jan. 3, 2023

(87) PCT Pub. No.: WO2022/002710
PCT Pub. Date: Jan. 6, 2022

(65) Prior Publication Data
US 2023/0299681 A1    Sep. 21, 2023

(30) Foreign Application Priority Data
Aug. 17, 2020  (EP) .................................. 20191390

(51) Int. Cl.
*H02M 3/158*     (2006.01)
*H02M 1/36*      (2007.01)
*H05B 45/38*     (2020.01)
(52) U.S. Cl.
CPC ........... *H02M 3/1588* (2013.01); *H02M 1/36* (2013.01); *H05B 45/38* (2020.01)

(58) Field of Classification Search
CPC ........ H02M 3/1588; H02M 1/36; H05B 45/38
See application file for complete search history.

(56) References Cited

U.S. PATENT DOCUMENTS 9,712,045 B2 * 7/2017 Mao ..................... H02M 1/36
10,686,377 B1 * 6/2020 Lu ......................... H02M 3/158
(Continued)

FOREIGN PATENT DOCUMENTS

KR       20120008459 A  *  1/2012

OTHER PUBLICATIONS

Chunlong Zhang et al., "Research on Soft Start Method for Buck-Boost Bi-Directional DC-DC Converter of Fuel Cell Power System", Circuits, Communications and Systems, 2009. PACCS '09. Pacific-Asia Conference O, IEEE, Piscataway, NJ, USA, May 16, 2009 (May 16, 2009), pp. 326-329, XP031526126, ISBN: 978-0-7695-3614-9.

(Continued)

*Primary Examiner* — Lincoln D Donovan
*Assistant Examiner* — James G Yeaman

(57) ABSTRACT

A boost converter has a main energy storage inductor and a main GaN boost switch with a node between them. A pre-charging switch is connected at the output side of the main boost switch and the inductor, between the node and an output capacitor. The pre-charging switch comprises a body diode in the forward direction from the output capacitor to the node. The output capacitor is charged by the pre-charging switch in a pre-charge phase and this provides a soft start-up to avoid large inrush currents. A third switch, which is also a GaN switch, is in series with the pre-charging switch to provide synchronous output rectification. The third switch has a body diode in a forward direction from the node to the output capacitor. In the pre-charge phase, both the boost switch and third switch are turned off whereas in a (Continued)

subsequent boost phase, the pre-charging switch is turned constantly on, and alternately the boost switch and the third switch are turned on and off to implement the boost conversion.

16 Claims, 3 Drawing Sheets

(56) References Cited

U.S. PATENT DOCUMENTS

| | | | |
|---|---|---|---|
| 2006/0232253 A1 | 10/2006 | Salato et al. | |
| 2010/0164400 A1* | 7/2010 | Adragna | |
| 2015/0194888 A1* | 7/2015 | Kasai ................... | H02M 1/32 |
| | | | 323/271 |
| 2015/0249385 A1* | 9/2015 | Takahashi ............ | H02M 3/156 |
| | | | 315/291 |
| 2016/0149494 A1 | 5/2016 | Li | |
| 2017/0117810 A1* | 4/2017 | Ghosh ................ | H02M 1/4241 |

OTHER PUBLICATIONS

Lu, Chien-Chun, et al., "A 5V Output Voltage Boost Switching Converter With Hybrid Digital and Analog PWM Control," Low-Power Electronics and Design (ISLPED), 2010 ACM/IEEE International Symposium on, IEEE, Piscataway, NJ, USA, Aug. 2010 (6 Pages).

* cited by examiner

BOOST CONVERTER AND METHOD OF CONTROLLING A BOOST CONVERTER

CROSS-REFERENCE TO PRIOR APPLICATIONS

This application is the U.S. National Phase application under 35 U.S.C. § 371 of International Application No. PCT/EP2021/067087, filed on Jun. 23, 2021, which claims the benefit of European Patent Application No. 20191390.2, filed on Aug. 17, 2020, which claims the benefit of International Application No. PCT/CN2020/10011, filed on Jul. 3, 2020. These applications are hereby incorporated by reference herein.

FIELD OF THE INVENTION

This invention relates to boost converters, for example for use in power factor correction circuits.

BACKGROUND OF THE INVENTION

A boost converter is a well known DC-to-DC switch mode power converter, typically used for stepping up a voltage from the input to an higher voltage at the output. The boost converter is for example supplied by a DC voltage at the output of a rectifier.

The boost converter comprises a main switch and an energy storage element, most typically an inductor in series with the input. The main switch controls the storage of energy in the inductor or the release of energy to a load.

When a boost converter operates in continuous mode, the current through the inductor never falls to zero. The switching duty cycle ensure the voltage across the inductor is zero so that after each cycle the inductor returns to the same state.

A boost converter is for example widely used to implement power factor correction. Indeed, continuous conduction mode power factor correction is widely used in applications with high power mains AC to DC conversion. Typically, a large electrolytic (EL) capacitor is used to filter the 50 or 60 Hz low frequency ripple. However, the large EL capacitor leads to a big inrush current during a start-up stage. At the start-up stage, the large EL capacitor is empty with no voltage stored on it, so the voltage of the mains input and the boost inductor is much larger than the voltage on the capacitor, generating an uncontrolled large current from the mains and the boost inductor flowing into the capacitor when the boost switch is off.

A common method to avoid this high inrush current is to provide a series relay switch and a parallel resistor (a negative temperature coefficient (NTC) resistor) at the AC mains side. The resistor helps to reduce the start-up inrush current, when the relay switch is turned off. The relay is used to bypass the resistor in normal operation. However, this circuit has a high cost and also a fixed power loss.

Another issue is the power loss caused by reverse recovery of the silicon MOS main switch and of a silicon diode used as a rectifier at the output side. A voltage vibration caused by the silicon diode which functions as the output rectifier also leads to EMI issues.

These issues limit the operating frequency and decrease the efficiency.

There is therefore a need for a boost converter design which addresses these issues, to allow high frequency of operation, with low cost and high efficiency.

US20150194888A1 discloses a circuit and operations of the circuit to achieve soft start for a boost converter.

US20060232253A1 discloses a circuit to prevent in-rush current for a boost converter after the boost converter has been started.

SUMMARY OF THE INVENTION

The invention is defined by the claims.

It is a concept of the invention to provide a boost converter having a main energy storage inductor and a main GaN boost switch. A pre-charging switch is connected at the output side of the main boost switch and the inductor, and connects to an output capacitor. The output capacitor is charged by the pre-charging switch in a pre-charge phase and this provides a soft start-up to avoid large inrush currents. A third switch, which is also a GaN switch, is in series with the pre-charging switch. In a pre-charging phase, the body diode of the third GaN switch can have small or nearly zero voltage drop in forward direction, and thus has very small power loss when the pre-charging switch conducts current from the input to the output capacitor. The third GaN switch can block the reverse current from the output capacitor to the input. In a normal boost phase, the first and third switches provide synchronous output rectification with a very high frequency that is supported by the GaN components, and the body diode of the third switch can also block the reverse current of the output capacitor from discharging through the first switch.

According to examples in accordance with an aspect of the invention, there is provided a boost converter comprising:
 a DC input;
 a boost inductor and a boost switch connected to the DC input, with a node defined between them;
 an output capacitor;
 a pre-charging switch connected between the node and the output capacitor, adapted to be conductive to charge the output capacitor from the node in a pre-charge phase, wherein:
 the pre-charging switch comprises a body diode in the forward direction from the output capacitor to the node; and the boost converter further comprises:
 a third switch in series with the pre-charging switch, having a source terminal connected to the output capacitor and having a body diode in a forward direction from the node to the output capacitor, wherein the boost switch and the third switch each comprises a GaN switch, wherein:
 in a pre-charge phase, both the boost switch and third switch are turned off, and the pre-charging switch is operated in a PWM manner to charge the output capacitor, and the body diode of the third switch is adapted to allow a current from the input to the output capacitor when the pre-charging switch is turned on and to block the reverse current from the output capacitor through the body diode of the pre-charging switch when the pre-charging switch is turned off; and
 in a boost phase after the pre-charge phase, the pre-charging switch is turned constantly on, and alternately the boost switch and the third switch are turned on and off to implement the boost conversion.

This is a boost converter which uses a GaN-based boost solution. The pre-charge phase implements a soft start function, whereas the alternate control of the boost switch and the third switch implements the boost function with synchronous rectifying.

The pre-charging function for the output capacitor takes place via the pre-charging switch while the GaN switches are off. The body diode of the third (GaN) switch is in the direction with the cathode connected to the output capacitor. This means that during the pre-charge time, with the third (GaN) switch off, the body diode of the third switch blocks current flowing back to the node, and hence back to the input, from the output. The pre-charging switch then operates, for example in a PWM mode or a linear charging mode, to limit the inrush current. The forward direction of the body diode of the third switch has low power loss and can block the reverse current from the output capacitor.

During the boost mode, the synchronous GaN switching takes place with the pre-charging switch turned on. This prevents the body diode of the pre-charging switch from blocking the current flowing from the input via the node to the output.

The use of GaN switches for the boost mode and synchronous rectification mean the operating frequency is no longer limited by the reverse recovery power loss of a silicon transistor body diode or silicon diode. This part of the power loss is proportional to frequency, so the converter can thus support high frequency applications. The GaN switches have almost no reverse recovery loss, so the power loss caused by the synchronous rectification is no longer influenced by frequency. This gives increased system efficiency and enables high frequency operation and use in high power density applications. This also assists with the EMI design for the converter.

The boost switch and the third switch are turned on and off oppositely during the boost conversion, so an inductor current builds up through the boost switch then flows to the load through the third switch.

The pre-charging switch is for example operated in a PWM manner and the duty cycle of the pre-charging switch is increased from 0% to 100% during the pre-charge phase. This provides a gradual increase in input current, avoiding a high inrush input current.

The boost converter may further comprise an AC mains input and a rectifier, wherein the output of the rectifier comprises said DC input.

A filtering network may be provided across the output of the rectifier, said filtering network comprises a pi-filter including two filtering capacitors and a filtering inductor.

The boost converter for example comprises a non-switched coupling between the AC mains input and the rectifier. The pre-charging switch avoids the need for a switch arrangement at the input, such as a relay and parallel NTC resistor, for avoiding a high inrush current. The pre-charging switch replaces such a switch arrangement.

The output capacitor for example comprises an electrolytic capacitor.

The pre-charging switch may comprise a silicon MOSFET. The pre-charging switch can be implemented as a silicon MOSFET, which is lower cost than the use of a GaN switch. The pre-charging switch is at the DC output side of the converter where the RMS current is lower than at the AC input, leading to lower power losses (compared to a relay solution at the input side).

In a shut down phase, a shut down signal for the pre-charging switch may be adapted to lag behind shut down signals for the third switch and the boost switch. This ensures an inductor current flow path exists until the system is fully shut down.

The boost mode is for example a continuous conduction mode.

The invention also provides a LED driver comprising:
a boost converter as defined above, as a PFC stage; a switch mode power converter coupled to an output of the PFC stage; and an output of the switch mode power converter for delivering power to a LED load.

The switch mode power converter for example comprises an LLC resonant converter.

The invention also provides a lighting unit, comprising: the LED driver as defined above; and the LED load.

The invention also provides a method of controlling a boost converter, wherein the boost converter comprises:
a DC input; a boost inductor and a GaN boost switch connected to the DC input, with a node defined between them;
an output capacitor;
a pre-charging switch connected between the node and the output capacitor, the pre-charging switch comprising a body diode in the forward direction from the output capacitor to the node; and
a third, GaN, switch in series with the pre-charging switch and having a body diode in a forward direction from the node to the output capacitor,
wherein the method comprises:
implementing a pre-charge phase by turning off both the boost switch and the third switch and operating the pre-charging switch to charge the output capacitor; and
implementing a boost phase after the pre-charge phase, by turning the pre-charging switch constantly on and alternately turning on and off the boost switch and the third switch to implement the boost conversion.

The method may comprise operating the pre-charging switch in a PWM manner and increasing the duty cycle of the pre-charging switch from 0% to 100% during the pre-charge phase.

The method may also comprise, in a shut down phase, generating a shut down signal for the pre-charging switch which lags behind shut down signals for the third switch and the boost switch.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
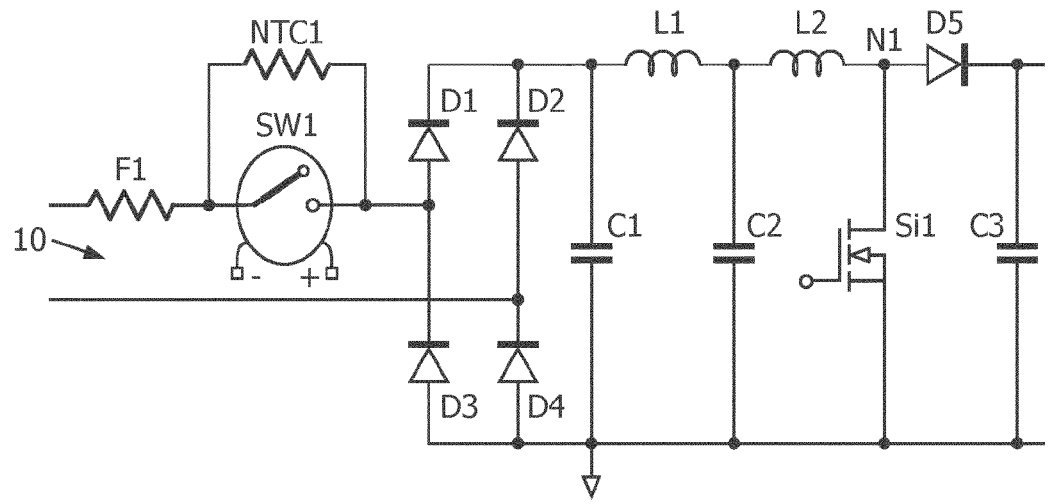
FIG. 1 shows a first known CCM power factor correction circuit using a boost converter.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a boost converter having a main energy storage inductor and a main GaN boost switch with a node between them. A pre-charging switch is connected at the output side of the main boost switch and the inductor, between the node and an output capacitor. The pre-charging switch comprises a body diode in the forward direction from the output capacitor to the node. The output capacitor is charged by the pre-charging switch in a pre-charge phase and this provides a soft start-up to avoid large inrush currents. A third switch, which is also a GaN switch, is in series with the pre-charging switch to provide synchronous output rectification. The third switch has a body diode in a forward direction from the node to the output capacitor. In the pre-charge phase, both the boost switch and third switch are turned off whereas in a subsequent boost phase, the pre-charging switch is turned constantly on, and alternately the boost switch and the third switch are turned on and off to implement the boost conversion.

FIG. 1 shows a first known CCM power factor correction circuit, comprising an input rectifier followed by a DC-DC boost converter. The circuit comprises an AC input which is rectified by a diode bridge rectifier D1 to D4 to deliver a DC input to the boost converter.

A filtering network is provided across the output of the rectifier D1 to D4, in this example comprising a pi-filter including two filtering capacitors C1, C2 and a filtering inductor L1.

The boost converter comprises a boost inductor L2 and a boost switch Si1 connected to the DC input, with a node N1 defined between them. A silicon rectifier diode D5 is connected in the forward direction from the node N1 to an output capacitor C3 (an EL capacitor), across which the DC bus voltage is defined. The boost switch Si1 normally does not provide a soft-start function to limit the in-rush input current.

At the AC input side, there is a series fuse F1 and a relay switch SW1. A negative temperature coefficient (NTC) resistor NTC1 is in parallel with the relay switch SW1. Initially the switch SW1 is off, and the input current flows through the NTC resistor. The NTC resistor initially has a high resistance (before it heats as a result of the current flowing) thus reduces the input current/in-rush current, and when it heats up by the input current, its impedance gradually decreases. This gradually allows more current to flow. After entering a stable state (when the output capacitor has been charged to the output level), the switch SW1 is switched on to bypass the NTC resistor to reduce the power loss of the resistor, since the resistor is no longer useful for limiting the in-rush current. The diode D4 blocks the reverse current of the output capacitor C3. A drawback of this circuit is the power loss on the NTC resistor and on the diode D4.

Figure 2:
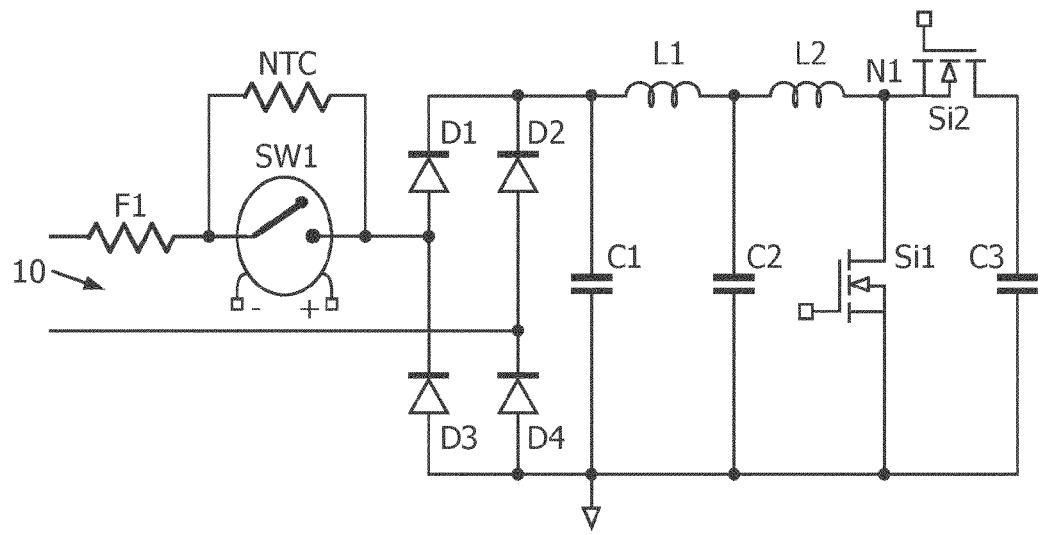
FIG. 2 shows a second known CCM power factor correction circuit using a boost converter.

FIG. 2 shows a second known CCM power factor correction circuit, again comprising an input rectifier followed by a DC-DC boost converter.

The circuit is basically the same as the circuit of FIG. 1 and comprises an AC input 10 which is rectified by the diode bridge rectifier D1 to D4. After the filter C1, L1, C2, the boost converter comprises the boost inductor L2 and the boost switch Si1. Instead of a silicon rectifier diode D5 as in FIG. 1, a silicon MOS transistor Si2 is connected between the node N1 and the output capacitor C3. This is controlled to provide synchronous rectification at the output. When the boost switch Si1 is off, the switch Si2 is on such that its conduction resistance Rds is quite small, reducing the power loss on it, compared with the power loss on the diode D5 in FIG. 1.

At the AC input side, there is again a series fuse F1 and a relay switch SW1. A negative temperature coefficient resistor NTC1 is in parallel with the relay switch SW1.

In both of these circuits, the NTC resistor helps to reduce start-up inrush currents. The relay is used to bypass the NTC in normal operation. However, this arrangement leads to high cost and fixed power loss.

Figure 3:
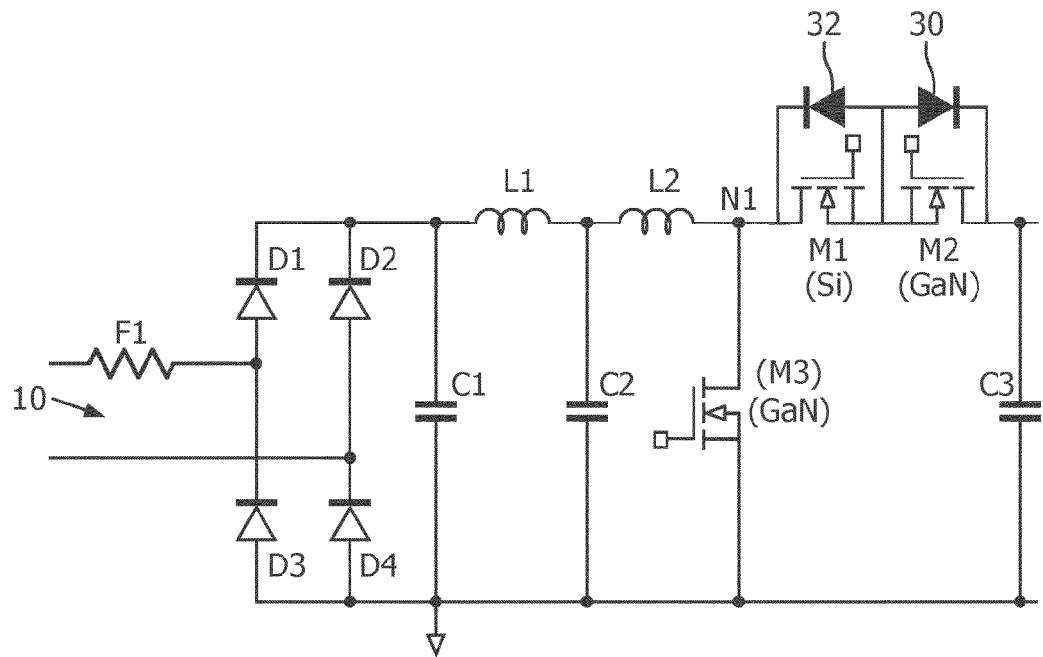
FIG. 3 shows an example of a circuit in accordance with the invention.

FIG. 3 shows an example of a circuit in accordance with the invention.

As for the circuits of FIGS. 1 and 2, there is an AC input 10 which is rectified by a diode bridge rectifier D1 to D4 to deliver a DC input to the boost converter.

The filtering network is provided across the output of the rectifier D1 to D4, again comprising a pi-filter including two filtering capacitors C1, C2 and a filtering inductor L1. However, this is optional, so that the rectifier output may connect directly to the main parts of the boost converter or other filtering arrangements may be used.

The boost converter comprises a boost inductor L2 and a boost switch M3 connected to the DC input, with a node N1 defined between them. The boost switch M3 is a GaN transistor.

At the output side of the node N1, there is now a pre-charging switch M1 connected between the node and the output capacitor C3. This could be a GaN transistor, but to reduce cost it may be silicon transistor such as a silicon MOSFET. This pre-charging switch is adapted to be conductive to charge the output capacitor C3 from the node N1 in a pre-charge phase. The pre-charging switch M1 comprises a body diode 32 in the forward direction from the output capacitor to the node.

A third switch M2 is in series with the pre-charging switch M1. This third switch is a GaN transistor. It has a body diode 30 in a forward direction from the node N1 to the output capacitor C3. The switches M1 and M2 may be in either order.

Figure 4:
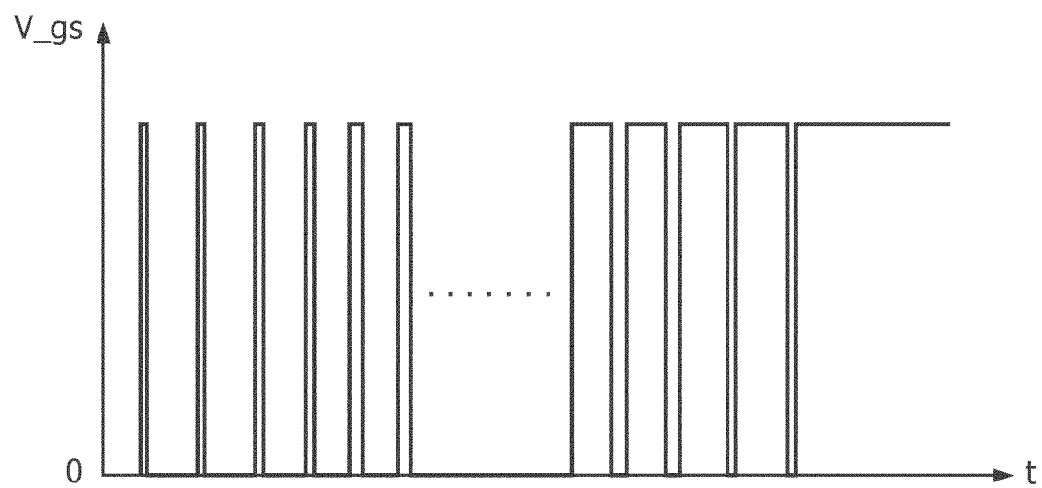
FIG. 4 shows PWM operation of the pre-charging switch.

In a pre-charge phase, both the boost switch M3 and third switch M2 are turned off, and the pre-charging switch M1 is operated to charge the output capacitor C3. This charging may use pulse width modulation (PWM) control of the pre-charging switch M1 as shown in FIG. 4, or else the charging switch may be operated in the linear regime.

In a boost phase, after the pre-charge phase, the pre-charging switch M1 is turned constantly on, and alternately the boost switch M3 and the third switch M2 are turned on and off to implement the boost conversion.

The third switch M2 implements synchronous rectification, whereas the pre-charge switch provides the inrush current control. Using a GaN switch instead of a silicon transistor for the synchronous rectification increases the system efficiency and makes the system suitable for high frequency and high power density applications.

The pre-charging switch M1 is controlled such as to enable it to replace the NTC resistor and relay. Thus, at the AC input side, there is only a series fuse F1, and the input side is non-switched. The use of the pre-charging switch instead of a relay and NTC resistor gives cost benefits, and also enables the pre-charging switch to be at the DC output side where the RMS current is lower than at the AC input side. This leads to a lower power loss, and the pre-charging switch may thus be a low cost silicon transistor.

Thus, the use of a GaN boost switch and GaN switch of the synchronous output rectification function overcomes the issue that the operating frequency of silicon-based circuits is limited due to the reverse recovery power loss of the body diode of a silicon MOS transistor or of a silicon rectifier diode. This part of the power loss is proportional to frequency, so a traditional CCM PFC circuit as described above is not able to operate at high frequencies and the power density and efficiency is limited. GaN devices have almost no reverse recovery loss, so the power loss resulting from the synchronous rectification is no longer influenced by frequency. This is of benefit for EMI design aspects as well as improving power density and efficiency.

The pre-charging function for the output capacitor takes place via the pre-charging switch M1 while the GaN switches M2, M3 are off. The body diode 30 of the third switch M2 is in the direction with the anode connected to the MOSFET source hence in the forward direction towards the output capacitor C3. This means that during the pre-charge time, with the third switch M2 off, the body diode 30 of the third switch blocks current flowing back to the node N1, and hence back to the input, from the output. The pre-charging switch M1 then operates in a PWM mode or a linear charging mode. A PWM mode for example uses a duty cycle controlled to limit inrush current.

When the pre-charging switch M1 is operated in a PWM manner, the duty cycle of the pre-charging switch may be increased from 0% to 100% during the pre-charge phase.

FIG. 4 shows this operation, by showing the gate-source voltage pulses for the pre-charging switch M1 over time, with gradually increasing duty cycle. The duration of this pre-charging stage will depend on the inrush limitation requirement and the size of the output capacitor C3. The frequency of the PWM pre-charging signal is much greater than the mains frequency but not so high as to introduce significant switching losses. The frequency is for example in the range 1 kHz to 10 kHz.

After the pre-charging is complete, the circuit operates in the boost mode. During the boost mode, the synchronous GaN switching takes place with the pre-charging switch M1 turned ON constantly. This saves the power loss on the pre-charging switch M1. The boost switch M3 and the third switch M2 are turned on and off oppositely during the boost conversion (in conventional manner), so an inductor current builds up through the boost switch then flows to the load through the third switch.

The circuit thus operates in the manner of a traditional CCM PFC circuit. The control signal for the pre-charging switch M1 is always high, whereas the control signals for M2 and M3 are generated by the PFC controller. No current flows through the body diode 32 of M1, so there are no reverse recovery issues. Because the GaN transistors have almost no reverse recovery charge, the overall power loss is reduced.

Table 1 and table 2 below show a power loss comparison for the main components between the traditional CCM PFC circuit (with synchronous rectification) of FIG. 2 and the circuit of FIG. 3 at different input voltages. The calculation results show that the circuit of FIG. 3 has reduced power loss and the power loss is dispersive, which is helpful for the thermal design.

The calculations are based on a 230 Vac/50 Hz input for table 1 and 120 Vac/60 Hz for table 2. The output is 600 W at 400V and the boost converter operation frequency is 300 kHz.

TABLE 1

| 230 V/50 Hz | FIG. 2 | FIG. 3 |
|---|---|---|
| Inrush protection components | Relay: 2.77 W | M1: Si-MOS: 1.48 W |
| Synchronous rectifier | Si2: Si-MOS: 4.08 W | M2: GaN: 1.96 W |
| Total loss | 6.85 W | 3.44 W |

TABLE 2

| 120 V/60 Hz | FIG. 2 | FIG. 3 |
|---|---|---|
| Inrush protection components | Relay: 0.75 W | M1: Si-MOS: 0.67 W |
| Synchronous rectifier | Si2: Si-MOS: 3.37 W | M2: GaN: 1.02 W |
| Total loss | 4.12 W | 1.69 W |

When the PFC converter is to be shut down, the shut down signal for the pre-charging switch M1 may be timed to lag behind M2 and M3 to ensure the inductor current flow path exist until the system is fully shunt down.

One application of interest is for an LED driver.

Figure 5:
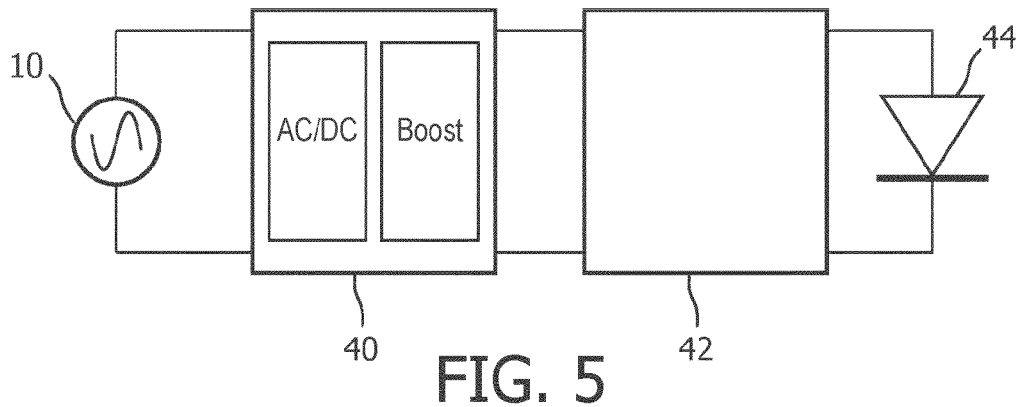
FIG. 5 shows a dual stage LED driver circuit.

FIG. 5 shows a dual stage LED driver circuit, comprising the boost converter 40 as described above used as a PFC stage. A switch mode power converter 42 is coupled to an output of the PFC stage. The output of the switch mode power converter 42 (and hence the output of the LED driver) is for delivering power to a LED load 44.

Any desired switch mode power converter may be used as the second stage 42, such as an LLC resonant converter.

The invention may also be used in a single-stage constant current boost PFC driver.

Figure 6:
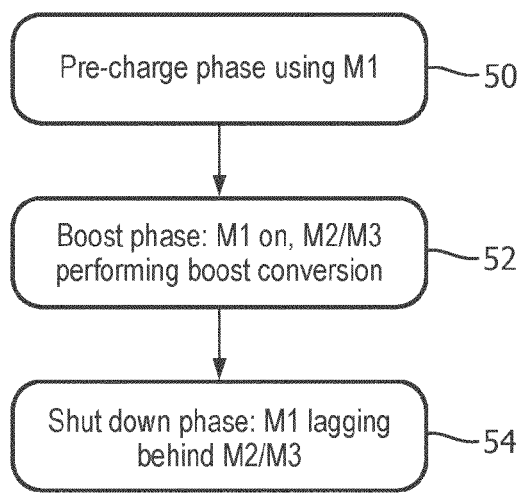
FIG. 6 shows a method of controlling the boost converter.

FIG. 6 shows a method of controlling the boost converter as described above. The method comprises, in step 50, implementing a pre-charge phase by turning off both the boost switch M3 and the third switch M2, and operating the pre-charging switch M1 to charge the output capacitor C3.

In step 52, a boost phase is implemented after the pre-charge phase, by turning the pre-charging switch M1 constantly on and alternately turning on and off the boost switch M3 and the third switch M2 to implement the boost conversion.

Step 54 is a shut down phase, during which a shut down signal is generated for the pre-charging switch M1 which lags behind shut down signals for the third switch M2 and the boost switch M3.

The invention has been explained above with reference to a continuous conduction mode operation of the boost converter. However, the invention may be applied in any high power boost conversion application. The benefit of the inrush protection method also applies to boundary conduction mode (BCM) and discontinuous conduction mode (DCM) operation of the boost converter. For DCM operation, the third switch M2 will be switched off during the dead time, after the freewheeling current returns to zero.

The invention has also been described above in connection with use of the boost converter in a PFC circuit. However, the invention may be applied to other uses of a boost converter circuit, in particular any high frequency and high power application.

The invention may be used in a single stage LED driver (e.g. with power factor correction) or as a PFC stage within a dual stage LED driver, or even within a multi-stage driver.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A boost converter comprising:
   a DC input;
   a boost inductor and a boost switch connected to the DC input, with a node defined between them;
   an output capacitor;
   a pre-charging switch connected between the node and the output capacitor, adapted to be conductive to charge the output capacitors from the node in a pre-charge phase, characterized in that:
   the pre-charging switch comprises a body diode in the forward direction from the output capacitor to the node;
   the boost converter further comprises a third switch in series with the pre-charging switch, having a source terminal connected to the output capacitor, and having a body diode in a forward direction from the node to the output capacitor, wherein the boost switch and the third switch each comprises a GaN switch and the pre-charging switch comprising a silicon MOSFET;
   in a pre-charge phase, both the boost switch and third switch are turned off, and the pre-charging switch is operated in a PWM manner to charge the output capacitor, and the body diode of the third switch is adapted to allow a current from the input to the output capacitor when the pre-charging switch is turned on and to block the reverse current from the output capacitor through the body diode of the pre-charging switch when the pre-charging switch is turned off; and
   in a boost phase after the pre-charge phase, the pre-charging switch is turned constantly on and the boost switch and the third switch are turned on and off oppositely to implement the boost conversion.

2. The boost converter of claim 1, wherein the duty cycle of the PWM of the pre-charging switch is increased from 0% to 100% during the pre-charge phase.

3. The boost converter of claim 1, further comprising an AC mains input and a rectifier, wherein the output of the rectifier comprises said DC input.

4. The boost converter of claim 3, comprising a filtering network across the output of the rectifier, said filtering network comprises a pi-filter including two filtering capacitors and a filtering inductor.

5. The boost converter of claim 3, comprising a non-switched coupling between the AC mains input and the rectifier.

6. The boost converter of claim 1, wherein the output capacitor comprises an electrolytic capacitor.

7. The boost converter of claim 1, wherein in a shut down phase, a shut down signal for the pre-charging switch is adapted to lag behind shut down signals for the third switch and the boost switch.

8. The boost converter of claim 1, wherein the boost mode is a continuous conduction mode.

9. A LED driver comprising:
   a boost converter according to claim 1, as a PFC stage;
   a switch mode power converter coupled to an output of the PFC stage; and
   an output of the switch mode power converter for delivering power to a LED load.

10. The LED driver of claim 9, wherein the switch mode power converter comprises an LLC resonant converter.

11. A lighting unit, comprising:
    the LED driver of claim 9 and
    the LED load.

12. A method of controlling a boost converter, wherein the boost converter comprises:
    a DC input;
    a boost inductor and a GaN boost switch connected to the DC input, with a node defined between them;
    an output capacitor;
    a pre-charging switch connected between the node and the output capacitor, the pre-charging switch comprising a body diode in the forward direction from the output capacitor to the node; and
    a third, GaN, switch in series with the pre-charging switch and having a body diode in a forward direction from the node to the output capacitor,
    wherein the method comprises:
    implementing a pre-charge phase by turning off both the boost switch and the third switch, and operating the pre-charging switch in PWM manner to charge the output capacitor and the body diode of the third switch—is adapted to allow a current from the input to the output capacitor when the pre-charging switch is turned on and to block the reverse current from the output capacitor through the body diode of the pre-charging switch when the pre-charging switch is turned off; and
    implementing a boost phase after the pre-charge phase, by turning the pre-charging switch constantly on and oppositely turning on and off the boost switch and the third switch to implement the boost conversion.

13. The method claim 12, comprising operating the pre-charging switch in a PWM manner and increasing the duty cycle of the pre-charging switch from 0% to 100% during the pre-charge phase.

14. The method of claim 12, comprising, in a shut down phase, generating a shut down signal for the pre-charging switch which lags behind shut down signals for the third switch and the boost switch.

15. The boost converter of claim 1, wherein the frequency of the PWM of the pre-charging switch is in a range of 1 kHz to 10 kHz.

16. The method of claim 12, wherein the frequency of the PWM of the pre-charging switch is in a range of 1 kHz to 10 kHz.

* * * * *